Jan. 17, 1939.  F. G. WILSON  2,144,004
BEER COOLER AND DISPENSER
Filed July 2, 1936    4 Sheets-Sheet 1

Inventor
F. G. WILSON
Attorneys

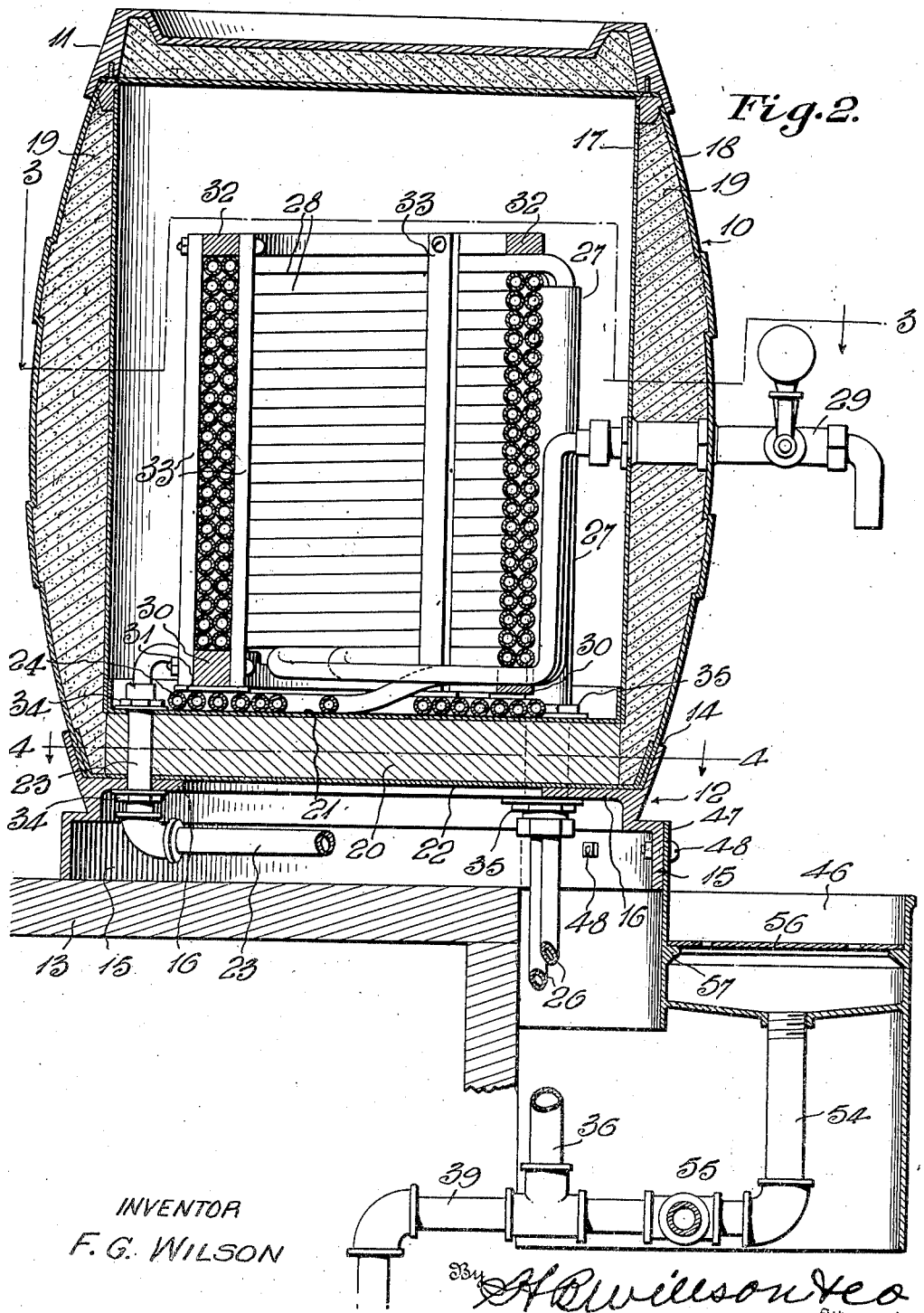

Jan. 17, 1939.   F. G. WILSON   2,144,004
BEER COOLER AND DISPENSER
Filed July 2, 1936   4 Sheets-Sheet 3

Inventor
F. G. WILSON

Jan. 17, 1939.　　　　　F. G. WILSON　　　　　2,144,004
BEER COOLER AND DISPENSER
Filed July 2, 1936　　　　4 Sheets-Sheet 4

Inventor
F. G. WILSON
By H. B. Wilson &c
Attorneys

Patented Jan. 17, 1939

2,144,004

UNITED STATES PATENT OFFICE 2,144,004

BEER COOLER AND DISPENSER

Fred Gerard Wilson, Brooklyn, N. Y.

Application July 2, 1936, Serial No. 88,632

9 Claims. (Cl. 225—1)

The invention aims primarily to provide an attractive, simple and inexpensive, efficient compact and self-contained refrigerating and dispensing unit which may be placed upon a bar or counter without altering or defacing the same, said unit having a sink for drainage purposes which occupies a position behind the counter or bar and may, if desired, be equipped with an automatic glass washer.

Further objects are to provide for cooling the beer to desired temperature as it passes through the dispenser without requiring pre-cooling; to provide a dispenser which is economical in ice consumption even though it may act also as means for furnishing ice-water; to provide a dispenser which requires no change in the pressure system now used for elevating the beer from the kegs, and to provide a dispenser which is free of parts which are liable to cause trouble and require periodic attention.

A still further object is to provide in a simple way for cooling the beer to one extent or another, for instance, to dispense it at much colder temperature in hot weather than in cold, or according to the preference of the majority of customers.

With the foregoing and minor objects in view, the invention resides in the novel subject matter hereinafter described and claimed, description being accomplished by reference to the accompanying drawings.

Fig. 2 is a vertical sectional view as indicated by line 2—2 of Figs. 1 and 3.

Figure 1:
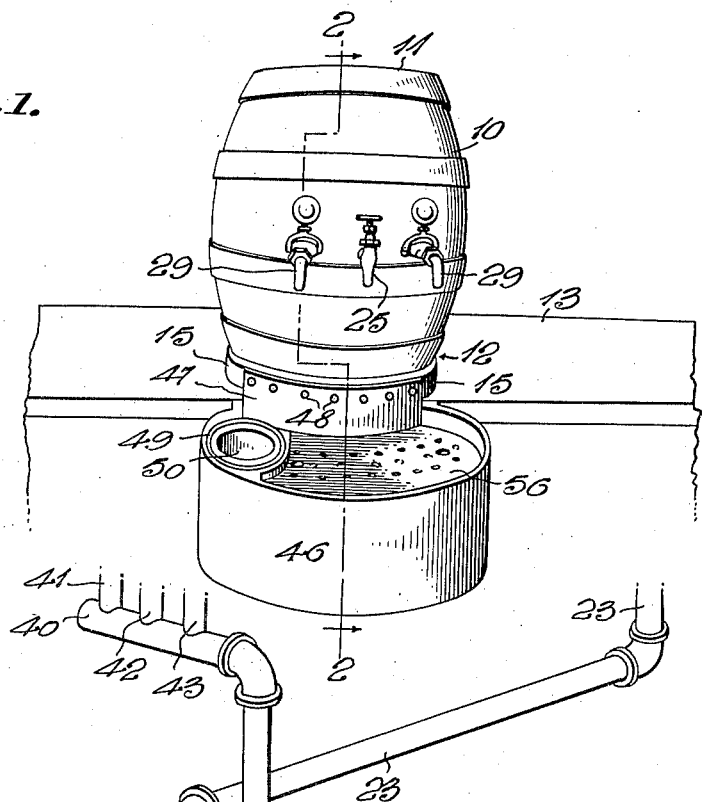
Fig. 1 is a perspective view showing the side of the device toward the bar-tender or counter attendant.
Figure 6:
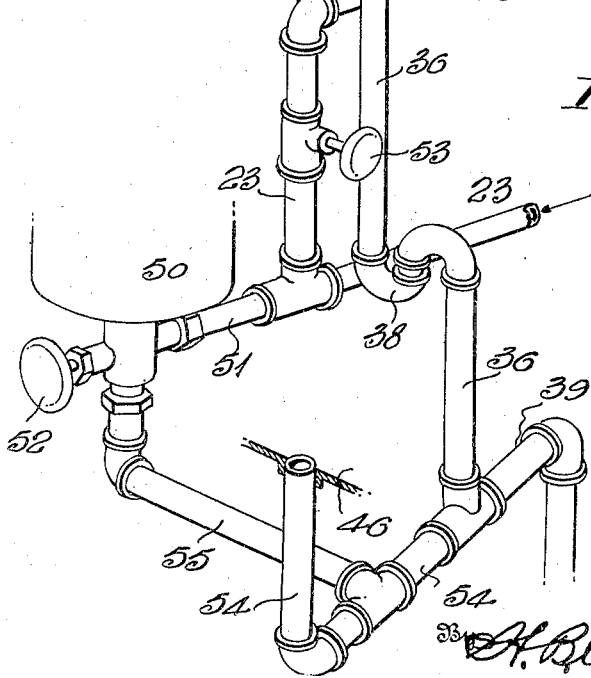
Fig. 6 is a perspective view showing the piping for water supply and drainage purposes.
Figure 3:
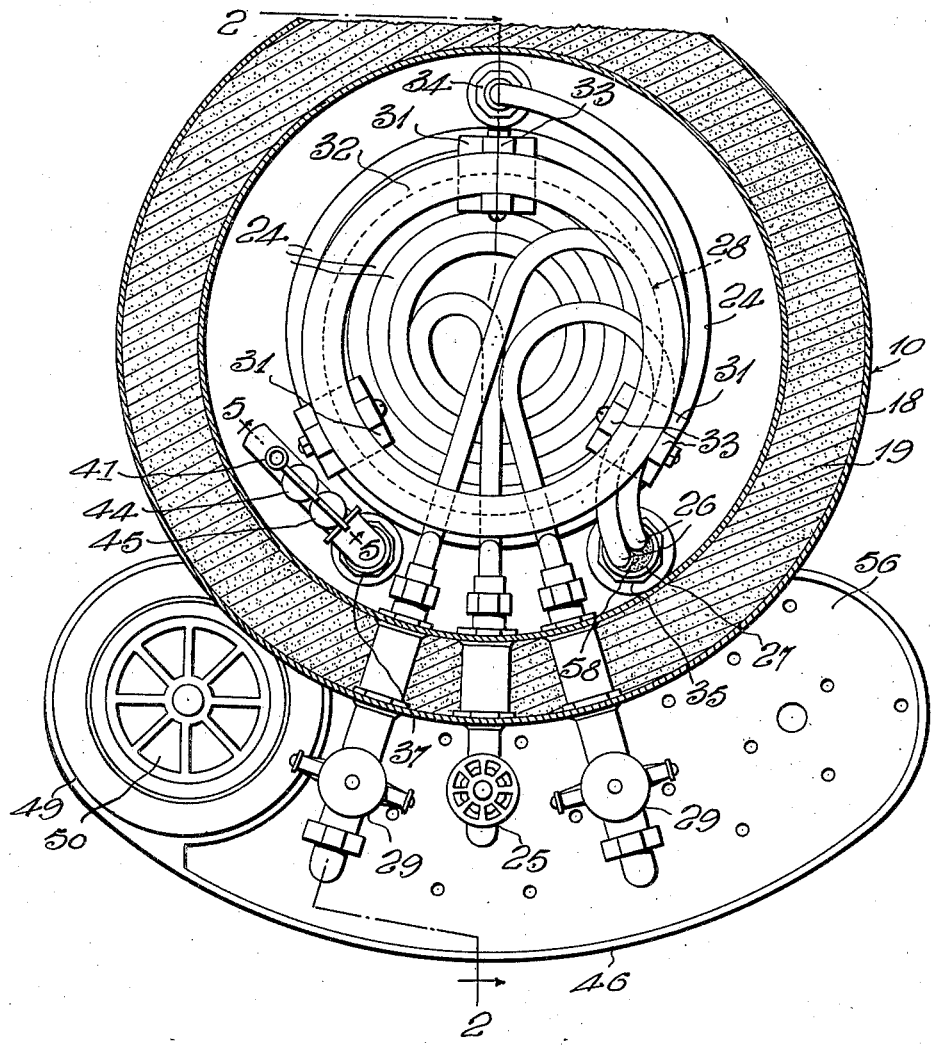
Fig. 3 is a horizontal sectional view on line 3—3 of Fig. 2.

A preferred construction has been illustrated and will be specifically described, with the understanding however, that within the scope of the invention as claimed, variations may be made.

A container 10 for ice and iced water, is provided, said container preferably simulating a beer keg and being provided with a removable top 11 whose peripheral edge simulates the upper hoop of the keg. The container 10 is provided with a base 12 to rest on a counter or bar 13 and projects rearwardly therefrom, said base having an upstanding flange 14 representing the lower hoop of the keg. The base 12 comprises an annular side wall 15, a horizontal inwardly projecting annular flange 16, and the flange 14, said flange 16 serving to support the container proper. This container is composed of inner and outer sheet metal shells 17 and 18 and heat-insulating material 19 between them. A wooden block 20 is interposed between the bottom 21 of the inner shell 17 and the bottom 22 of the outer shell 18 and occupies most of the space between said bottoms, the remainder of said space being filled with the heat-insulating material 19. The ends of the block 20 project into overlying relation with the flange 16, giving solid support to the entire bottom upon which the weight of the ice and iced water, as well as the weight of the water and beer-cooling coils, is supported.

A water line, various portions of which are indicated by the reference number 23, leads from the city or domestic water system to a water-cooling coil 24 which is spirally wound and rests upon the bottom of the container 10, said coil being provided with a suitable faucet 25 at the rear side of said container. Two beer-conducting lines 26 enter the container 10 through a vertical pipe 27, which pipe extends upwardly in said container to a point above the highest intended water level. The beer lines 26 are connected in the usual way with the conventional pressure system for elevating the beer, and these lines are provided with helically wound coils 28 within the container 10, said coils having faucets 29 at the rear side of said container. The coils 28 rest upon a ring 30 having supporting plates 31 resting on the water-cooling coil 24, an upper ring 32 rests on said coils 28, and coil-stabilizing bars 33 are disposed vertically at the inner and outer sides of said coils 28, said bars being secured to said rings 30 and 32. The coils are thus rigidly supported and are protected against possible injury or distortion when dumping cracked ice into the upper end of the container.

Figure 5:
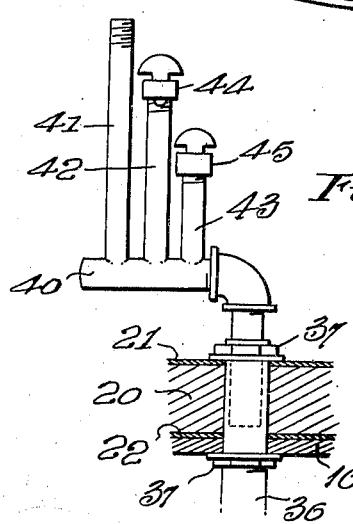
Fig. 5 is a detail vertical section partly in elevation substantially on line 5—5 of Fig. 3.

A portion of the water line 23 passes through alined openings in the flange 16 of the base 12, the block 30 and the bottoms 21 and 22 of the inner and outer container shells, and clamping nuts 34 are provided on said pipe portion to tightly clamp the intervening parts together. The pipe 27 passes through the same parts and is provided with nuts 35 performing the same function as the nuts 34. A drainage pipe 36 which is used to maintain one water level or another in the container 10, also passes through the parts 16, 22, 20 and 21 (see Fig. 5) and is provided with nuts 37 assisting in clamping said parts solidly together. The pipe 36 is provided with a suitable trap 38 and is connected with a drain pipe 39 leading to a sewer or the like. The upper end of pipe 36 is of inverted L-shape and its horizontal portion 40 is provided with a plurality of upstanding over-flow pipes, three of these pipes being herein shown as denoted at 41, 42 and 43. Pipe 41 is relatively long, pipe 43 is comparatively short and the pipe 42 is of an intermediate length. I have shown valves 44 and 45 on the pipes 42 and 43, which valves allow the iced water to drain from the container 10 to the level at which the upper end of pipe 43 is disposed, or to the level of the upper end of pipe 42, or to the level at which the upper end of pipe 41 is located. Thus, a greater or lesser quantity of iced water may be maintained in the lower end of the container. The portions of the coils above the water level are directly subjected to the action of the crushed ice. Thus, if the valve 44 be closed and valve 45 opened, maintaining a low level of water in the container, a greater part of the beer coils will be directly subjected to the ice, than if the pipe 42 or pipe 41 be used to determine the water level. Moreover, the crushed ice in the container will chill a relatively small volume of water in said container to a lower temperature than it will chill a relatively large volume of water. Thus, with the low water level, the beer will be chilled to a lower degree than when maintaining a comparatively high water level. In actual practice, with the valves so set that pipe 43 determines the water level in the container, the beer will be chilled to 32° F.; when pipe 42 is used to maintain a somewhat higher level of water, the beer is chilled to 36° F.; and when the water is permitted to stand at a level even with the upper end of the pipe 41, the dispensing temperature of the beer will be 40° F. I am thus enabled in a simple manner to vary the temperature at which the beer will be dispensed, as may be desired.

A sink 46 is provided under the faucets 25 and 29, said sink projecting downwardly from the container 10 to occupy a position behind the counter or bar 13 and to abut the rear edge of said counter or bar. The front side wall 47 of this sink projects upwardly above the other walls of said sink and is secured by bolts or the like 48 to the rear portion of the base wall 15. Preferably one end of the sink is provided with a vertically disposed sleeve-like portion 49 in which an automatic glass washer 50 of conventional form, may be mounted. A branch line 51 leads from the water line 23 to the washer and is provided with a control valve 52, a suitable portion of the line 23 being also provided with a valve 53. A drain pipe 54 leads from the bottom of the sink 46 to the drain pipe 39, and another drain pipe 55 leads from the washer 50 to said pipe 54. The sink is provided with the usual perforated plate 56 (omitted in Fig. 4), which plate preferably rests on a ledge 57.

Figure 4:
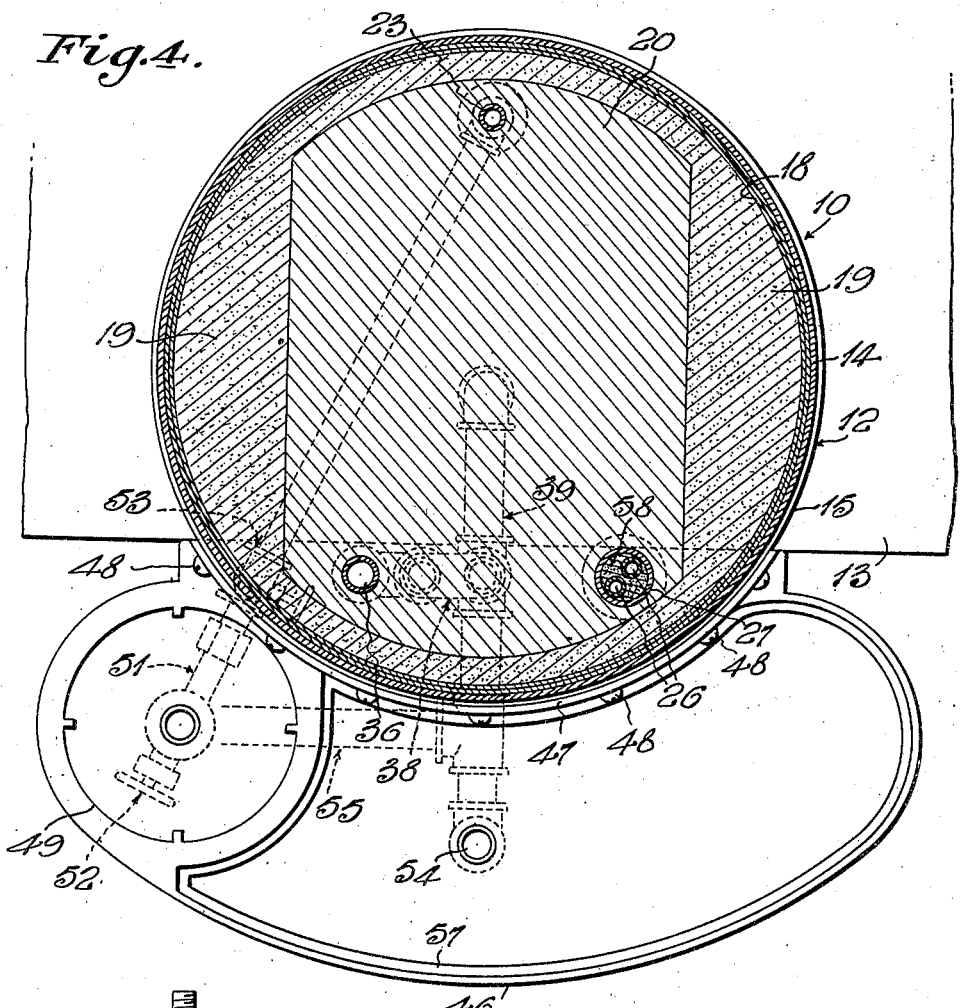
Fig. 4 is a horizontal sectional view on line 4—4 of Fig. 2.

To prevent loss of cooling efficiency by means of air passing through the pipe 27, the portion of this pipe around the beer lines 26 is filled with an appropriate cement 58 (Fig. 4). Thus, the entire container is substantially air-tight and due to its effectively insulated construction, efficient refrigeration will take place without the necessity of pre-cooling the beer.

Attention is invited to the rearward projection of the base 12 beyond the counter 13, providing a space between the rear edge of said counter and the rear portion of the annular base side wall 15. Further attention is invited to the curvature of the front sink wall 47 in conformity with the aforesaid base side wall 15, providing another space between the intermediate portion of said front sink wall 47 and the rear of the counter 13. These two spaces provide adequately for passage of the beer lines 26, water line 23 and drain pipe 36 to the bottom of the container and this structure also insures that the line and pipe portions in the immediate vicinity of the counter shall be shielded from view and from injury. Moreover, as the sink 46 abuts the rear of the counter, it prevents any accidental forward pushing of the base 12 upon said counter and thus overcomes danger of forcing the beer lines 26 (usually of comparatively soft metal) against the counter with danger of injury.

It will be seen from the foregoing that novel and advantageous provision has been made for carrying out the objects of the invention, and attention is again invited to the possibility of making variations within the scope of the invention as claimed.

I claim:—

1. A beverage refrigerator and dispenser comprising a refrigerating container to rest upon and project rearwardly from a counter, said container having a dispensing faucet at its rear side, and a sink under said faucet to occupy a position behind the counter, said sink projecting downwardly from said container to abut the rear edge of the counter and being secured to the lower rear portion of said container.

2. A beverage refrigerator and dispenser comprising a refrigerating container having a base to rest upon and project rearwardly from a counter, said container having a dispensing faucet at its rear side, and a sink under said faucet to occupy a position behind the counter, said sink projecting downwardly from said container to abut the rear edge of the counter, the front portion of said sink being secured to the rear portion of said base.

3. A beverage refrigerator and dispenser comprising a refrigerating container having a base provided with a circular side wall to rest upon and project rearwardly beyond a counter, said container having a dispensing faucet at its rear side, and a sink under said faucet to occupy a position behind the counter, said sink projecting downwardly from said container to abut the rear edge of the counter and having a curved front wall projecting upwardly beyond the other walls of the sink and secured to the rear portion of said circular side wall of said base.

4. A beverage refrigerator and dispenser comprising a container for ice and iced water, a beverage-conducting line having a cooling coil within said container extending both into the upper and lower portions thereof, at least two water overflow passages leading from vertically spaced portions of said container, and a valve for at least the lowermost of said overflow passages, said overflow passages being both spaced upwardly from the container bottom, whereby the iced water in the container may be maintained at a relatively low level or at a relatively high level to subject a greater or lesser portion of the coil directly to the ice according to the temperature at which the beverage is to be dispensed.

5. A beverage refrigerator and dispenser comprising a container for ice and iced water, a beverage-conducting line having a cooling coil within said container extending both into the upper and lower portions thereof, a drain pipe extending through the bottom of said container and having a horizontal upper end portion within the container, at least two overflow pipes in said container connected with said horizontal end portion of said drain pipe and of different heights, and a valve for at least the shorter of said overflow pipes, whereby the iced water in the container may be maintained at a relatively low level, thus changing the temperature of the water to a relatively low temperature or a relatively higher temperature depending on the depth of the water, and as the water surrounds the coils, changing the temperature of the beverage in conformity with the temperature of the water.

6. A beverage refrigerator and dispenser comprising a container having inner and outer sheet metal shells and heat insulation between them, said shells having sheet metal bottoms and heat insulation filling part of the space between said bottoms, a block filling the remainder of said space and lying against both of said bottoms, an annular base for the container having a bottom-engaging flange which extends into underlying relation with said block; said bottoms, said block and said bottom-engaging flange of said base having alined openings, a pipe entering the container through said openings and clamping nuts on said pipe abutting the lower side of said bottom-engaging flange of said base and the upper side of the bottom of said inner shell.

7. In a beverage refrigerator and dispenser, a container for ice and iced water, a liquid-conducting line having a spiral coil resting upon the bottom of said container, a lower horizontal coil-supporting ring resting upon said spiral coil, a second liquid-conducting line having a vertically elongated helical coil resting upon said lower ring, an upper horizontal ring resting upon the upper end of said helical coil, and vertical coil-holding bars secured to the inner and outer peripheries of said lower and upper rings and lying against the inner and outer sides of said helical coil.

8. In a beverage cooling and dispensing apparatus, a counter, a container having a base provided with an annular side wall resting on said counter, said base projecting rearwardly from the counter sufficiently to provide a space between the rear portion of said annular side wall and the rear edge of the counter, a sink behind said counter and abutting said rear edge thereof, said sink having an upstanding front wall secured at its upper end to said rear portion of said annular base side wall, said sink wall being curved in conformity with said annular base side wall whereby the intermediate portion of said sink wall is rearwardly spaced from the counter, a beverage cooling coil in said container having a discharge faucet over said sink, and a beverage-conducting line immediately behind said counter and passing through the container bottom to said coil, said line extending through the space between said curved sink wall and counter, and through the space between said rear portion of said annular base wall and counter.

9. In a beverage cooler and dispenser, a container for refrigerant, a liquid-conducting line having a spiral coil supported in a horizontal plane within the lower end of said container, a horizontal coil-supporting ring resting upon said spiral coil, a second liquid-conducting line having a vertically elongated helical coil resting on said coil-supporting ring, and vertical coil-holding bars secured to and projecting upwardly from said coil-supporting ring, said bars being disposed at the inner and outer sides of said helical coil.

FRED GERARD WILSON.